March 16, 1937.  E. J. MULLEN  2,074,061

PRODUCTION OF SULPHUR DIOXIDE

Filed April 20, 1934

INVENTOR
*Edwin J. Mullen*
BY
ATTORNEY

Patented Mar. 16, 1937

2,074,061

UNITED STATES PATENT OFFICE 2,074,061

PRODUCTION OF SULPHUR DIOXIDE

Edwin J. Mullen, New Rochelle, N. Y., assignor to General Chemical Company, New York, N. Y., a corporation of New York Application April 20, 1934, Serial No. 721,421

10 Claims. (Cl. 23—177)

This invention relates to methods and apparatus for the production, from sulphurous liquid mixtures or compounds, of sulphur dioxide gas mixtures adaptable for use in the manufacture of sulphuric acid or for other purposes, together with other valuable products depending on the exact nature of raw material treated. The invention is directed more especially to the production of sulphur dioxide gas mixtures from liquid mixtures or compounds such as acid sludges and sludge acids comprising waste products of oil refining processes in which sulphuric acid is employed; waste sludge acids such as those resulting from the wet purification of sulphur dioxide gases in the manufacture of sulphuric acid; and sludge acids recovered from other processes.

The term "acid sludge" is generally used to define the acid mass obtained directly from the agitators in which petroleum distillates have been treated with sulphuric acid. Heretofore in the recovery of sulphuric acid from acid sludges obtained in the treatment of petroleum distillates with sulphuric acid or sulphuric anhydride, the sludge has been treated with steam or water in suitable retorts. This treatment results in the separation of the sludge into a tarry mass and a dilute impure sulphuric acid which settles to the bottom of the treating vessel. In the art, this impure acid has been designated as "weak acid" or "sludge acid". Further, dilute impure acids such as those recovered from the wet purification of sulphur dioxide gases in the manufacture of sulphuric acid by the contact process have been usually termed "sludge acids". Similar dilute acids containing various impurities resulting as by-products of other chemical processes are likewise known in the art as "sludge acids".

The present invention particularly aims to provide for recovery of sulphur compounds from acid sludges and sludge acids formed in refining oils by decomposing the sludge material by heating with resultant formation of a gas mixture containing sulphur dioxide and production of solid carbonaceous residue. Decomposition of acid sludges by heat treatments have heretofore been proposed. Prior methods of decomposing acid sludge for the recovery of sulphur dioxide and production of coke involve, as a rule, the use of various types of retorts or kilns provided with agitators and the like, adapted to receive a substantial body of sludge. As known, acid sludges are corrosive because of the relatively large quantities of free and/or combined sulphuric acid contained therein. On account of the acid content of the sludges and the appreciably high temperatures at which decomposition is carried out, wear and tear on equipment is in many instances excessive, and parts of the apparatus utilized are comparatively shortlived. This factor is a considerable item in cost of operations. Furthermore, prior methods for decomposing sludges have generally been of such nature that in many cases the insulating effect of the body of coke formed has interfered with heat transfer to material in the inner parts of the mass of coke and partly decomposed acid sludge still undergoing decomposition.

One of the principal objects of the invention resides in the provision of a process for the recovery of sulphur as sulphur dioxide from liquid mixtures or compounds containing sulphur which may be carried out in apparatus containing a minimum of moving parts. It is a further object to provide for decomposition of sulphurous liquid materials by methods involving dispersion of the materials in a reaction zone and effecting decomposition of the materials while in the dispersed condition. The invention also contemplates a process by which such sludges may be decomposed and sulphur dioxide recovered in a continuous manner. As another object thereof, the invention aims to provide suitable apparatus for carrying out the improved process.

Because of the nature of the invention, objects and advantages thereof may be more fully understood from a consideration of the following description taken in connection with the accompanying drawing, in which—

Figure 1:
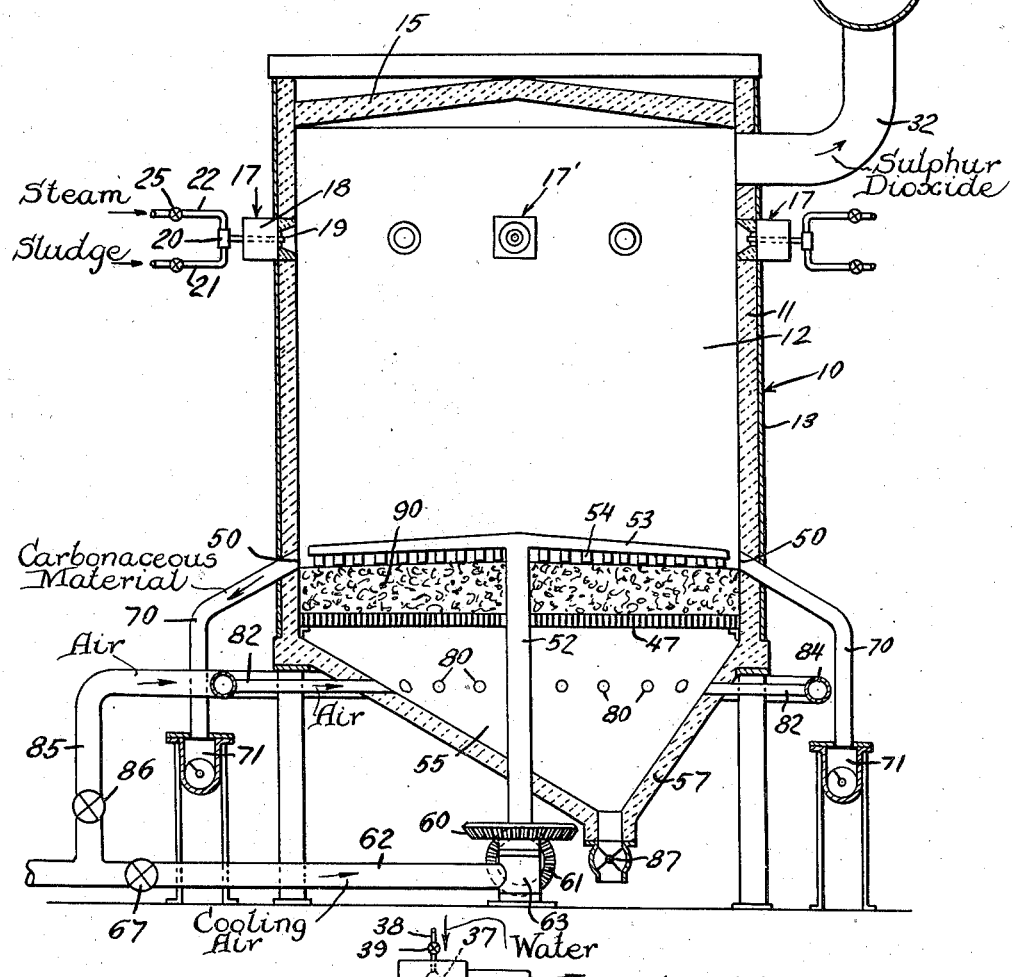
Fig. 1 is a vertical section of a preferred embodiment of a furnace in which the improved process may be carried out.

Referring particularly to Fig. 1 of the drawing, numeral 10 designates a burner comprising a shell 11 constructed of suitable refractory material, such as firebrick, and defining a reaction chamber 12 of preferably cylindrical cross-section. Surrounding shell 11 is a steel casing 13 acting as a protective reinforcement. The upper end of the reaction chamber 12 is closed off by a crown member 15.

Extending through the shell 11 near the top thereof are a plurality of injector mechanisms indicated generally by reference numeral 17. The furnace may be provided with several injectors equally spaced about the periphery of the reaction chamber.

Each injector 17 includes a casing 18, one end of which projects through shell 11, the casings being supported in the position shown by any suitable brackets or arms connected to the steel casing 13. Extending axially through casing 18 is a nozzle 19 having on the outer end thereof a small chamber 20 to which are connected inlet pipes 21 and 22. Sulphurous liquids to be decomposed in the reaction chamber are fed into the chamber 20 preferably through pipe 21. Steam or other gas not adversely affecting the reaction in chamber 12 may be introduced into chamber 20 through pipe 22 containing a control valve 25.

Figure 2:
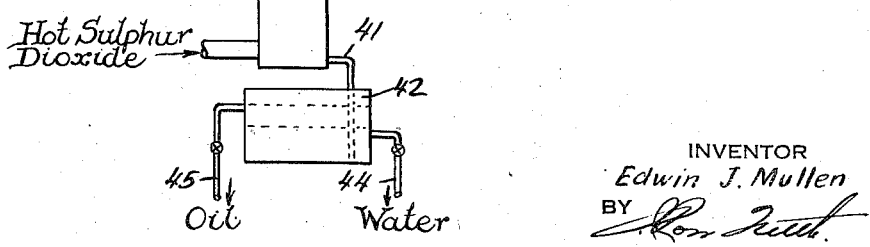
Fig. 2 is a diagrammatic illustration, on a reduced scale, of gas purification apparatus.

A gas main 32, for withdrawing gaseous products from reaction chamber 12, opens into the latter just beneath crown 15. Gases and vapors formed during the process are passed through conduit 32 into the lower end of a cooling tower 33 (Fig. 2). Gases flow from the top of the tower through pipe 35 to the point of use. Water or other cooling liquid is fed into the top of the cooling tower 33 through a spray head 37 fixed to the end of a water pipe 38 controlled by valve 39. Cooling liquid and condensates, running out of the bottom of tower 33, flow through pipe 41 into a tank 42. In the latter, oil and water are separated, and water is discharged through pipe 44 to waste or may be recirculated over the tower. Oil is withdrawn from the upper part of tank 42 through a pipe 45.

The bottom of reaction chamber 12 is formed by a grate 47. At an appreciable distance above the grate, say about 4 to 12 inches depending upon the size of the furnace, there are provided on the circumference of the shell one or more solid residue outlets 50. The grate has a central opening to accommodate a hollow rotatable shaft 52, carrying rabble arms 53 each having a plurality of downwardly extending plows 54 for feeding coke to openings 50. The shaft 52 and the rabble arms may be constructed in any suitable manner to permit circulation through the shaft and arms of cooling air, the arrangement being such that air heated in the arms and shaft is discharged at the base of the shaft into the atmosphere, or alternatively into the chamber 55 formed by the underside of the grate 47 and the hopper bottom 57. Shaft 52 is supported in suitable bearings and is rotated by a gear 60 meshing with a pinion 61 which in turn is driven from a source of power not shown. Cooling air is introduced into the shaft 52, from an air inlet pipe 62 terminating in a casing 63 surrounding the lower end of the shaft. The quantity of air passing through pipe 62 is controlled by a valve 67.

Coke discharged from the combustion chamber through outlet 50 runs through pipe 70 into a closed chamber 71 having therein a screw conveyor or other suitable means for discharging coke without admitting air to the combustion chamber.

Substantially all of the air which may be required to supply oxygen for burning fuel on the grate is introduced into the chamber 55 beneath grate 47 through a plurality of ports 80 suitably spaced about hopper bottom 57. The ports 80 communicate through short pipe sections 82 with a circular bustle 84 surrounding the furnace. Air is introduced into the bustle from an inlet pipe 85 having a control valve 86 and connecting with an air main. This air is preferably preheated. Hopper bottom 57 may be provided with a suitable air lock 87 to facilitate discharge of ash. The process may be operated under a minus pressure, in which case ports 80 may communicate directly with the atmosphere.

Acid sludges and sludge acids resulting from the refining of oils vary widely in composition. One representative acid sludge obtained from the refining of petroleum distillates with sulphuric acid contained for example, sulphuric acid, free and in combination, equivalent to 45% $H_2SO_4$, 35% oils and tarry hydrocarbons and 20% water. Another representative sludge contains sulphuric acid free and in combination, equivalent to 38% $H_2SO_4$, 42% oils and tarry hydrocarbons, and 20% water. The amount of residual petroleum coke in such acid sludges likewise varies over a considerable range, such sludges being of such nature as to produce from less than 15% to more than 65% residual petroleum coke. Sludge acids from the treatment of the acid sludges with steam and water likewise contain different quantities of free and/or combined sulphuric acid, and water, and generally contain materially smaller amounts of carbonaceous material than acid sludges. Furthermore, sludge acids such as those recovered from the wet purification of sulphur dioxide gases in the manufacture of sulphuric acid are of various compositions, generally containing 25–30% sulphuric acid and water, together with impurities such as iron sulphate, arsenic, and lead sulphate in solution and in suspension. Such sludge acids as these recovered from the manufacture of sulphuric acid and from other chemical processes contain little or no carbonaceous material.

The invention contemplates the recovery of sulphur dioxide from three types of sludges; first, acid sludges such as those recovered from the agitators in the refining of petroleum oils containing relatively large amounts of carbonaceous material, such amounts of carbonaceous material being in excess of that which when burned would generate heat sufficient to decompose the acid sludge; second, sludges containing some carbonaceous material but less than the amount which, if burned, would generate heat sufficient to decompose the sludge; and third, sludge acids such as those recovered from the purification system in the manufacture of sulphuric acid, containing little or no carbonaceous material. Of the foregoing, acid sludges of the first type are available in large quantities, and accordingly, in the preferred embodiments, the invention is particularly directed to the recovery of sulphur dioxide from acid sludges of this nature.

As indicated on the drawing, the apparatus illustrated is designed to operate under a plus pressure, air being fed into the furnace through bustle 84 and ports 80. In starting up the process, by utilizing work holes not shown, a fire is built on grate 47. Any solid carbonaceous fuel may be used, although coke is preferred. Enough coke is charged into the furnace to build up on grate 47 a bed 90 of glowing coke say about 4 to 12 inches deep, so that the surface of the coke bed is approximately beneath plows 54 in rabble arms 53. The amount of air admitted through ports 80 may be such that substantially all of the oxygen is used in burning the coke, so that gases rising from the surface of the coke bed comprise hot combustion gases containing little or no free oxygen. Preliminary heating of the furnace may be continued until the temperature of the furnace walls has been raised to about 500–600° F.

When the chamber has been heated to the desired temperature, a controlled quantity of sludge of the first type is fed into the injector 17 through feed pipe 21. Sludges of this nature may be viscous, and to facilitate injection into the reaction chamber 12, steam may be employed and admitted into the mixing chamber 20 through pipe 22, the amount of steam being regulated by adjustment of valve 25. The sludge is then injected into the upper end of the reaction chamber at spaced points about the periphery thereof. The amount of steam utilized is preferably that necessary to inject the sludge into chamber 12 and form a dispersion of the sludge material in the upper end of the reaction zone. The steam pressure should be such as to avoid throwing acid sludge on the walls of the reaction chamber at points diametrically opposite injector tubes. The operation of the several injector mechanisms 17 is accordingly controlled so that there is formed in the upper end of the reaction chamber 12 a relatively uniform dispersion of sludge material.

It is desirable to construct the furnace 10 so that the diameter of the reaction chamber 12 is relatively great thus permitting treatment of relatively large quantities of acid sludge in the chamber without causing contact of sludge or partially decomposed sludge with the inner walls of shell 11. In the preferred embodiment of the apparatus, the diameter of the reaction chamber approximately equals the height. On the other hand, the diameter may be less or greater than the vertical dimension.

Decomposition of acid sludge, containing appreciable quantities of carbonaceous matter, involves principally reduction of sulphuric acid by the carbonaceous material and/or by the hydrogen of hydrocarbons contained in the sludge with the production of sulphur dioxide and petroleum coke. The heat necessary to effect decomposition of the sludge in the reaction chamber 12 and reduction of free and/or combined sulphuric acid to sulphur dioxide is obtained by burning on the coke bed on grate 47 at least a part of the carbonaceous matter contained in the sludge.

The dispersion of sludge material formed in the upper end of the reaction zone falls toward the bottom of the chamber through a current of hot substantially non-oxidizing combustion gases rising from the hot coke bed in the bottom of the reaction chamber. The amount of air admitted through ports 80 to the chamber 55 beneath grate 47 is controlled so as to provide only oxygen substantially enough for combustion of that amount of coke of the coke bed, the burning of which coke is necessary to generate heat sufficient to maintain reactive temperatures in chamber 12. Ordinarily, conditions may be adjusted so that the temperature in the reaction chamber is in the neighborhood of 500-600° F. During the time decomposition of the sludge in the reaction chamber is effected by heat of the hot combustion gases rising from coke bed 90, the carbonaceous material formed in the combustion chamber falls through the chamber and is deposited on the surface of coke bed 90. On account of the negligible concentration of oxygen in the gases rising through the chamber, substantially no burning of carbonaceous material takes place until the material is deposited on the coke bed. The rate of rotation of rabble arms 53 is controlled so as to maintain the depth of the coke bed 90 say 4 to 12 inches, or any other desired depth in accordance with the size of the apparatus. The excess coke, over that needed to be burned to generate heat enough to carry out the process, is discharged by rabble arms 53 through outlets 50.

The gas mixture formed in the reaction chamber 12 contains relatively large quantities of sulphur dioxide, water vapor, nitrogen, carbon dioxide, and smaller amounts of hydrocarbon vapors, carbon monoxide, etc. Such a gas mixture at temperatures of about 500-600° F. flows through pipe 32 into the bottom of cooling tower 33. The valve 39, controlling spray head 37, is adjusted so as to admit to the tower a quantity of water sufficient to cool the gas stream rising through the tower to about 100° F. Cooling of the gas mixture to this extent effects condensation of the bulk of the water vapor and the major portion of condensable hydrocarbon vapors contained in the gas stream. Gas fed through pipe 35 to the point of use contains chiefly sulphur dioxide, carbon dioxide and nitrogen, and may be used directly or many be further purified if desired, diluted with air if necessary, and employed in the manufacture of sulphuric acid.

The temperature of the cooling water running out of the lower end of the tower 33 may be about 160° F., at which temperature no appreciable quantities of sulphur dioxide are absorbed and carried out of the tower with cooling water and condensates. In tank 42, oily condensates rise to the surface of the water and may be drawn off through pipe 45 and utilized as desired, while water is run through pipe 44 to waste or may be recirculated through the cooling tower 33.

The second type of sludge mentioned above is one containing some carbonaceous material but in amounts such that if burned, insufficient heat would be generated to effect decomposition of the acid sludge. Sludge of this nature may be treated by the process of the invention, and the advantages and economies of the improved process also obtained. Solid fuel such as pulverized coal or coke may be employed, in which case the solid fuel may be fed in thru injectors 17' of any suitable design. The sludge is introduced into the combustion chamber, and the process proceeds generally as already described above. The sludge material is decomposed, and the carbonaceous residue and possibly some incompletely decomposed particles of sludge material settle to the top of the fuel bed on grate 47. The additional carbonaceous fuel needed to carry on the operation, and introduced through injectors 17', drops without burning through the reaction chamber to the surface of the fuel bed. It will be understood the amount of extraneous fuel is regulated so as to provide, in conjunction with available carbonaceous material contained in the sludge, enough carbonaceous material on grate 47 such that when burned generates sufficient heat to carry on the process. In this mode of operation, a substantial bed of burning fuel is maintained on the grate, and as before the amount of air admitted through ports 80 is adjusted so as to provide approximately not more than enough oxygen to burn the carbonaceous material contained in the sludge and the additional extraneous fuel introduced. In this instance, however, it will be observed no excess of fuel accumulates in the bottom of the reaction chamber, and no unburned or partially burned fuel is discharged through outlets 50. The ash collecting in hopper bottom 57 may be discharged from time to time through lock 87.

When treating sludges of the second type, if desired substantially all of the heat required for decomposing the sludge may be obtained by burning liquid or gaseous fuel in a combustion chamber separate from the furnace shown in the drawing. Hot gases thus produced may be admitted by suitable piping into chamber 55 beneath grate 47 through ports 80, and pass upwardly through the coke bed on the grate. Gases of this nature would contain little or no oxygen, and whatever small amount of oxygen may be present would be consumed in burning a relatively small amount of coke while passing upwardly through the coke bed on the grate. Hence, in this way a bed of coke may be maintained on the grate when treating sludges of the second type, and a relatively constant depth of the coke bed may be assured by operation of the rabble arms 53, any excess amount of coke collecting on the bed being discharged through outlets 50.

A sludge of the third type noted above, such as sludge acid obtained as a by-product of the wet purification of sulphur dioxide gases in the manufacture of sulphuric acid by the contact process, contains substantially no carbonaceous material or other substance which would be available as fuel on grate 47. A sludge of this nature may be injected into the upper ends of the combustion chambers through injectors 17, and a required amount of suitable solid fuel as coal or coke may be fed in through injectors 17'. On introduction of the sludge and fuel into the top of the combustion chamber, the decomposition reaction taking place therein is then substantially the same as noted above in connection with a sludge of the second type, the principal difference in the case of a sludge of the third type being that substantially all of the carbonaceous material needed is introduced as extraneous fuel. The alternative method described above, relative to a sludge of type two in which method hot combustion gases are generated in a separate combustion chamber apart from furnace 10, may also be used when treating a sludge of the third type. In this situation, the coke bed on the grate may be established in any desired manner. The relatively small amount of coke burned may be replaced as needed from time to time for example by means of injectors 17'. Maintenance of the fuel bed on the grate and introduction of air or hot combustion gases, as the case may be, through ports 80 are regulated as in previously described operations.

In all modifications of the process, the decomposition of the sludge material is effected largely while the latter is in suspension in a relatively highly dispersed condition and while passing downwardly through an atmosphere heated to temperatures sufficient to decompose the sludge material. Particles of sludge material which may be only partially decomposed while in suspension settle on top of the fuel bed and are completely decomposed by exposure to the hot gases present in the lower end of the reaction zone. Since substantially all of the oxygen of the air introduced through ports 80 is utilized in burning fuel on the grate, the hot combustion gases rising from the fuel bed and passing upwardly through the reaction chamber contain substantially no oxygen, and explosion hazard is minimized. Because of countercurrent flow of gas and sludge material, gases and vapors formed by decomposition of sludge are immediately removed from the particles of sludge material undergoing decomposition, and such particles then drop downwardly and pass through an atmosphere containing decreasing amounts of gases and vapors produced in the reaction. These features are conducive to economical decomposition of sludge material while in gaseous suspension. Further, should decomposition of some of the particles of sludge be incomplete during drop through the reaction chamber, such particles fall onto the surface of the fuel bed and are exposed to the high temperatures whereby decomposition and coking is completed. The invention thus provides a process whereby sludge materials may be decomposed and valuable constituents recovered by a suspension operation in apparatus involving a minimum of moving parts.

I claim:

1. The method for decomposing sludge material derived from sulphuric acid treatment of hydrocarbon oils which comprises forming a dispersion of sludge material in a reaction zone, maintaining a body of combustible carbonaceous material in the reaction zone, burning at least a portion of said carbonaceous material to form hot gaseous combustion products containing little or no oxygen, and contacting the dispersed sludge material with the hot gaseous combustion products to decompose the sludge material to form sulphur dioxide and carbonaceous residue, and withdrawing sulphur dioxide from the reaction zone.

2. The method for decomposing sludge material derived from sulphuric acid treatment of hydrocarbon oils which comprises introducing sludge material into one end of a reaction zone, forming therein a dispersion of said sludge material in the reaction zone, maintaining adjacent the opposite end of the reaction zone a body of combustible carbonaceous material, burning at least a portion of said carbonaceous material to form hot gaseous combustion products containing little or no oxygen, and contacting the dispersed sludge material with the hot gaseous combustion products to decompose the sludge material to form sulphur dioxide and carbonaceous residue, and withdrawing sulphur dioxide from the reaction zone.

3. The method for decomposing sludge material derived from sulphuric acid treatment of hydrocarbon oils which comprises forming a dispersion of sludge material in a reaction zone, heating the sludge material in dispersed condition and while substantially no free oxygen is present to temperatures sufficient to decompose the sludge material and form sulphur dioxide and carbonaceous residue, forming in the reaction zone a body of carbonaceous residue, burning at least a portion of said carbonaceous residue to form hot gaseous combustion products, utilizing heat of said products to decompose the sludge material, and withdrawing sulphur dioxide from the reaction zone.

4. The method for decomposing sludge material derived from sulphuric acid treatment of hydrocarbon oils which comprises forming a dispersion of sludge material in a reaction zone, passing the sludge material in dispersed condition through the reaction zone countercurrent to a stream of hot, substantially non-oxidizing gas heated to temperatures sufficient to decompose the sludge material and form sulphur dioxide, and withdrawing sulphur dioxide from the reaction zone.

5. The method for decomposing sludge material derived from sulphuric acid treatment of hydrocarbon oils which comprises forming a dispersion of sludge material in a reaction zone, passing the sludge material in dispersed condition through the reaction zone countercurrent to a stream of hot, substantially non-oxidizing gas heated to temperatures sufficient to decompose the sludge material and form sulphur dioxide, said stream of hot gas being formed by burning at least a portion of combustible constituents contained in the sludge material, and withdrawing sulphur dioxide from the reaction zone.

6. The method of decomposing sludge material derived from sulphuric acid treatment of hydrocarbon oils to produce sulphur dioxide which comprises forming a suspension of sludge material in a reaction zone, heating the material therein to temperatures sufficient to decompose the sludge material and form sulphur dioxide and carbonaceous residue, maintaining reaction temperatures in the reaction zone by burning in the zone at least a portion of the carbonaceous residue under conditions such that hot combustion gases produced contain substantially no oxygen, and withdrawing sulphur dioxide from the reaction zone.

7. The method for decomposing sludge material derived from sulphuric acid treatment of hydrocarbon oils which comprises forming a dispersion of sludge material in a reaction zone, maintaining a body of combustible carbonaceous material in the reaction zone, passing oxidizing gas into said body of carbonaceous residue, regulating the amount of said oxidizing gas so as to burn sufficient carbonaceous material to generate heat enough to decompose the dispersed sludge material and maintain in said reaction zone a substantially non-oxidizing atmosphere, and withdrawing from the reaction zone sulphur dioxide formed by decomposition of the sludge material.

8. The method for decomposing sludge material derived from sulphuric acid treatment of hydrocarbon oils which comprises forming a dispersion of sludge material in a reaction zone, heating the sludge material in dispersed condition to temperatures sufficient to decompose the sludge material and form sulphur dioxide and carbonaceous residue, forming in the reaction zone a body of carbonaceous residue, passing oxidizing gas into said body of carbonaceous residue, regulating the amount of said oxidizing gas so as to burn sufficient carbonaceous residue to generate heat enough to decompose the dispersed sludge material and to form in said reaction zone a stream of hot, substantially non-oxidizing gas, contacting the hot gas with the dispersed sludge material to aid in decomposing the same, and withdrawing from the reaction zone sulphur dioxide formed by decomposing the sludge material.

9. The method for decomposing sludge material derived from sulphuric acid treatment of hydrocarbon oils which comprises introducing sludge material into a reaction zone, forming in the top thereof a dispersion of sludge material, passing the sludge material downwardly in dispersed condition while heating the same to temperatures sufficient to decompose the sludge material and form sulphur dioxide and solid carbonaceous residue, causing the solid carbonaceous residue to fall through the reaction zone to form and maintain in the bottom thereof a substantial layer of said carbonaceous residue, passing a current of air into the underside of said layer, regulating the amount of said air so as to support combustion of sufficient carbonaceous residue to generate heat enough to decompose the sludge material and form a stream of hot, substantially non-oxidizing gas, passing said gas stream upwardly through the falling dispersed sludge material to aid in decomposing the same, withdrawing from the top of the reaction zone sulphur dioxide formed by decomposing the sludge material, and discharging from the bottom of the reaction zone unburned carbonaceous residue.

10. The method for decomposing sludge material derived from sulphuric acid treatment of hydrocarbon oils which comprises forming a dispersion of sludge material in a reaction zone, heating the sludge material in dispersed condition to temperatures sufficient to decompose the sludge material and form sulphur dioxide, forming in the reaction zone a body of carbonaceous material, causing any particles of sludge material only partially decomposed while in suspension to accumulate on said body of carbonaceous material, generating hot, gaseous, substantially non-oxidizing combustion products, exposing partially decomposed particles of sludge material while on said body of carbonaceous material to said hot combustion products to substantially completely decompose said particles, utilizing heat of said combustion products to decompose suspended sludge material, and withdrawing sulphur dioxide from the reaction zone.

EDWIN J. MULLEN.